US012726898B2

(12) United States Patent
Zacks et al.

(10) Patent No.: US 12,726,898 B2
(45) Date of Patent: Sep. 1, 2026

(54) RADIO RESOURCE MANAGEMENT DRIVEN ENERGY MANAGEMENT IN WIRELESS NETWORKS

(71) Applicant: Cisco Technology, Inc., San Jose, CA (US)

(72) Inventors: David John Zacks, Vancouver (CA); Indermeet Singh Gandhi, San Jose, CA (US); Jerome Henry, Pittsboro, NC (US); James F. Florwick, Frederick, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 413 days.

(21) Appl. No.: 18/450,688

(22) Filed: Aug. 16, 2023

(65) Prior Publication Data

US 2025/0063493 A1 Feb. 20, 2025

(51) Int. Cl.
*H04W 52/02* (2009.01)
*H04W 84/12* (2009.01)

(52) U.S. Cl.
CPC ... *H04W 52/0206* (2013.01); *H04W 52/0274* (2013.01); *H04W 84/12* (2013.01)

(58) Field of Classification Search
CPC ......... H04W 52/0206; H04W 52/0274; H04W 84/12
See application file for complete search history.

(56) References Cited

U.S. PATENT DOCUMENTS

2017/0187595 A1 6/2017 Tinnakornsrisuphap
2018/0041955 A1 2/2018 Wang et al.
2020/0334556 A1* 10/2020 Lele ........................ G06F 40/30
2020/0383064 A1 12/2020 Tellado et al.
2021/0058859 A1 2/2021 Henry et al.
2021/0099887 A1* 4/2021 Wang .................. H04B 17/318
2022/0174589 A1 6/2022 Bellamkonda et al.
2024/0259937 A1* 8/2024 Li ........................ H04W 48/20

OTHER PUBLICATIONS

Cisco, "Cisco DNA Center AI-Enhanced RRM Deployment Guide", Sales Resources, https://www.cisco.com/c/en/us/products/collateral/wireless/catalyst-9800-series-wireless-controllers/ai-enhanced-rrm-dg.html, updated: Mar. 13, 2023, 130 Pages.

(Continued)

*Primary Examiner* — Siming Liu
(74) *Attorney, Agent, or Firm* — Edell, Shapiro & Finnan, LLC

(57) ABSTRACT

A method to manage access points in a wireless network to save power during off-peak hours. The method includes operating a wireless local area network including access points with the access points powered on, receiving information indicative of channel utilization levels for each of the access points over a predetermined period of time, receiving respective indications of occupancy levels of a space that is covered by the access points during the predetermined period of time, predicting a low occupancy period of the space based on the channel utilization levels and the respective indications of occupancy levels, and during the low occupancy period, causing a first group of the access points to be powered off, and causing a second group of the access points to remain powered on.

20 Claims, 5 Drawing Sheets

(56) References Cited

OTHER PUBLICATIONS

Hetting, C., "Cisco's AI-based Wi-Fi Optimisation 'Learns' from World's Largest Enterprise Wi-Fi Footprint", Wi-Fi Now, https://wifinowglobal.com/news-and-blog/ciscos-ai-based-wi-fi-optimisation-engine-learns-from-worlds-largest-wi-fi-footprint/, Sep. 17, 2022, 4 Pages.

Sciencedirect, "Radio Resource Management", Journal of Network and Computer Applications, https://www.sciencedirect.com/topics/computer-science/radio-resource-management, 2018, 7 Pages.

* cited by examiner

INITIAL: CAPACITY MODE
ALL RADIOS ON

LATER: COVERAGE MODE
MOST OF THE RADIOS TURNED OFF

RADIO RESOURCE MANAGEMENT DRIVEN ENERGY MANAGEMENT IN WIRELESS NETWORKS

TECHNICAL FIELD

The present disclosure relates to wireless network operations, and more particularly to techniques to control wireless access points to achieve improved energy management.

BACKGROUND

As the world continues to grapple with the impacts of climate change, many companies have set ambitious goals to reduce their greenhouse gas (GHG) emissions. One way for companies to achieve these goals is to reduce energy consumption, which can significantly lower their carbon footprint. While there are various ways to save energy, one often-overlooked area is the wireless local area network (WLAN), and particularly access points (APs) of the WLAN that remain powered on throughout the day regardless of occupancy of a given location. This always-on AP state not only leads to wasted energy, but also unnecessarily increases a company's energy costs and carbon footprint.

DETAILED DESCRIPTION

Overview

Figure 1:
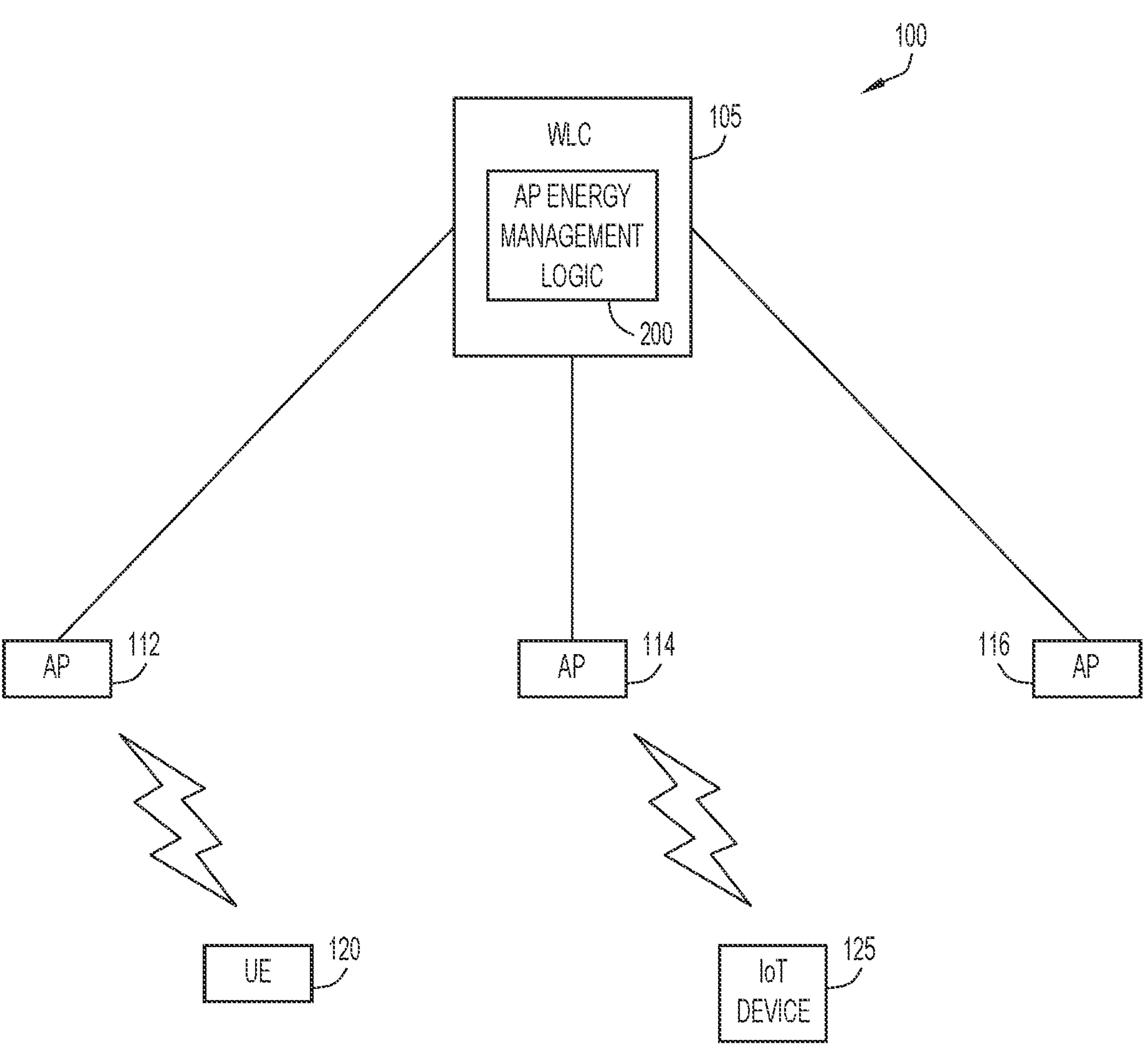
FIG. 1 shows access points of a wireless network in communication with a wireless local area network controller, or WLC, which may host AP energy management logic, according to an example embodiment.

A method to manage access points in a wireless network to save power during off-peak hours is provided. The method includes operating a wireless local area network including access points with the access points powered on, receiving information indicative of channel utilization levels for each of the access points over a predetermined period of time, receiving respective indications of occupancy levels of a space that is covered by the access points during the predetermined period of time, predicting a low occupancy period of the space based on the channel utilization levels and the respective indications of occupancy levels, and during the low occupancy period, causing a first group of the access points to be powered off, and causing a second group of the access points to remain powered on.

In another embodiment, a device is provided. The device includes an interface configured to enable network communications, a memory, and one or more processors coupled to the interface and the memory, and configured to operate a wireless local area network including access points with the access points powered on, receive information indicative of channel utilization levels for each of the access points over a predetermined period of time, receive respective indications of occupancy levels of a space that is covered by the access points during the predetermined period of time, predict a low occupancy period of the space based on the channel utilization levels and the respective indications of occupancy levels, and during the low occupancy period, cause a first group of the access points to be powered off, and cause a second group of the access points to remain powered on.

Example Embodiments

In recent years, the number of wireless access points (APs) has increased dramatically due to the growth of the Internet of Things (IoT) and the increasing demand for wireless connectivity. As noted in the background section above, most, if not all, of these APs are left powered on throughout the day, even when there is no one around to use them. This results in a significant waste of energy and resources, which has negative implications for the environment and the cost of energy bills. Power efficient networks are a new demand from WLAN customers.

Wireless access points often have multiple radios operating at different frequencies, such as 2.4 GHz, 5 GHz, and 6 GHz. Each radio consumes energy even when not in use, contributing to energy waste. To reduce energy consumption, and in accordance with the embodiments described herein, it is possible to turn off some or all radios of selected APs in the WLAN, and control the operating mode of those APs that remain powered on, based on predictive occupancy patterns.

More specifically, when users are not present in a given or predetermined location (e.g., an office) during off-peak hours or off-work hours, capacity may not be a primary goal. That is, it does not make sense to have all APs of a WLAN powered on and consuming energy during those low occupancy periods. At the same time, switching off all APs off would not be desirable, as there would no longer be any wireless network functionality available to anyone arriving at the given location. Moreover, if the APs are powered off, they will not detect the presence of anyone (for those APs that may also have presence/occupancy sensors).

To address this issue, the present embodiments provide an approach to predict not only occupancy patterns, but also which radios are likely to be in use. That is, the described embodiments use techniques that may leverage machine learning (including artificial intelligence (AI)) to process occupancy patterns, channel utilization, and throughput demand across radio types and, leveraging that information, to predict future occupancy patterns and determine which APs/radios to switch off, and to control operational modes of other radios to maintain a minimum coverage footprint for the given location.

FIG. 1 shows access points of a wireless local area network, or WLAN 100, in communication with a wireless local area network controller, or WLC 105, which may host AP energy management logic 200, according to an example embodiment. As shown, AP 112, AP 114, and AP 116, are each in communication with WLC 105. User equipment, or UE 120, and/or an IoT device 125, may be in communication with at least one of the APs. As will be described in detail below, AP energy management logic 200 is configured to determine or predict which ones of the APs, over a given period of time, should be powered on or off, and which ones of the APs should be controlled to achieve a minimum coverage footprint for the given location in which AP 112, AP 114, and AP 116 operate.

Figure 2:
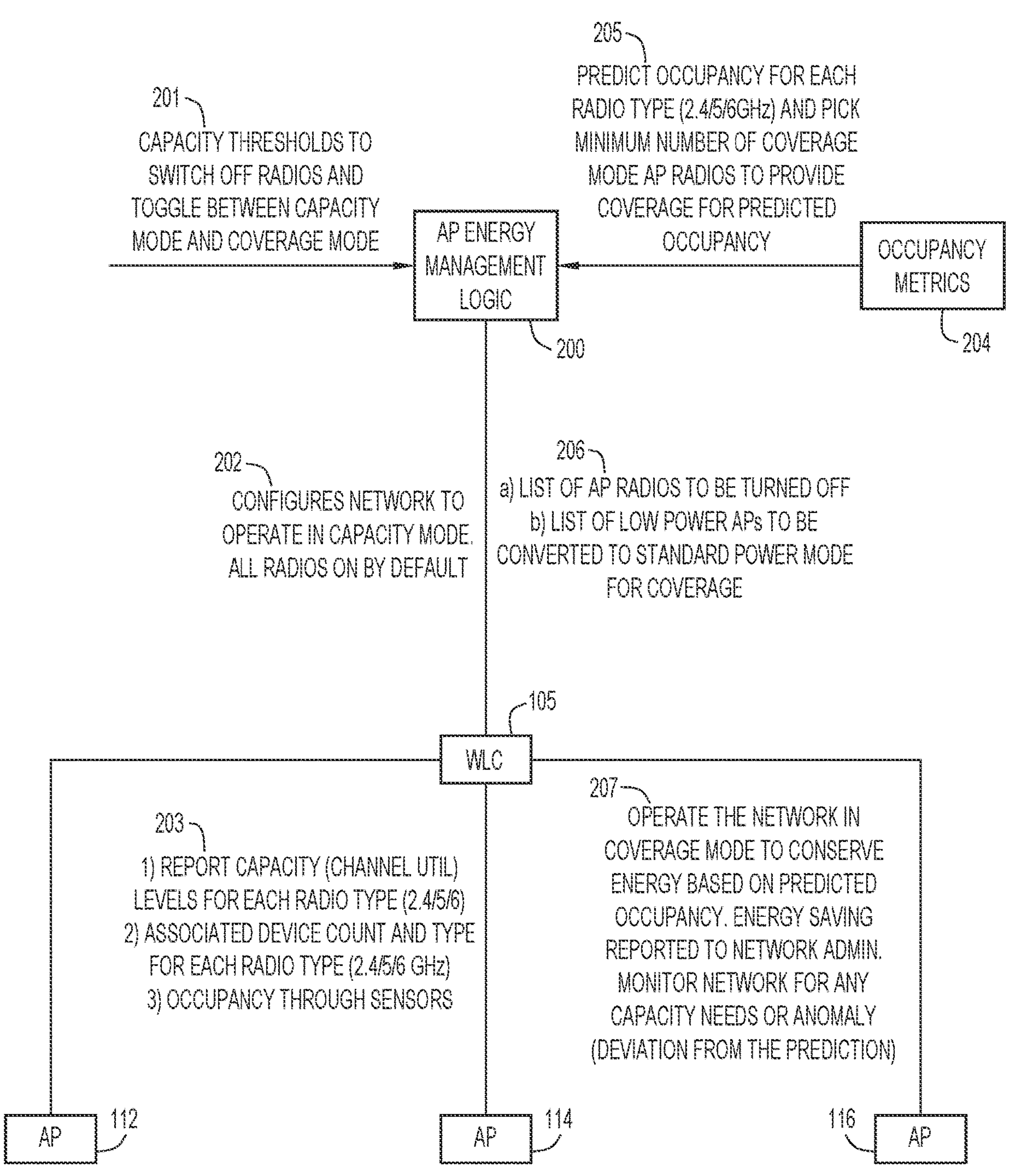
FIG. 2 illustrates input data to, and output instructions from, AP energy management logic, according to an example embodiment.

FIG. 2 illustrates input data to, and output instructions from, AP energy management logic 200, according to an example embodiment. It is noted that in the example of FIG. 2, AP energy management logic 200 is shown as not being hosted by WLC 105, in contrast to the example of FIG. 1 in which WLC 105 is shown hosting AP energy management logic 200. Those skilled in the art will appreciate that either implementation is possible.

As shown, at 201, AP energy management logic 200 receives information indicative of capacity thresholds for WLAN 100, including thresholds at which to switch off radios and/or toggle between capacity mode (i.e., in which all APs are on) and coverage mode (i.e., in which selected, or a subset of, APs/radios are on) for APs in WLAN 100. A representation of capacity is channel utilization levels for each radio type (e.g., 2.4/5/6 GHz). In some cases, these thresholds can be auto-generated and be specific to each environment. These act as the initial baseline for operation of WLAN 100.

At 202, and, initially, to ensure full WLAN capability, WLC 105 (by instruction from, e.g., AP energy management logic 200) configures WLAN 100 to provide capacity for all possibly expected users. That is, the APs are instructed to operate to provide capacity, i.e., all radios of each of AP 112, AP 114, and AP 116 are turned on (in, perhaps, a low power mode).

At 203, AP energy management logic 200 receives, via WLC 105, channel utilization levels for each radio type reported by each AP, i.e., AP 112, AP 114, and AP 116. Additionally, device count and type (e.g., phone brand/model A, phone brand/model B with all 3 radios, IoT devices with only a 2.4 GHz radio, older model phones with just 2.4/5 GHz radios, etc.) are reported along with occupancy level as determined from environmental (occupancy/presence) sensors which may be built into each AP.

At 204, AP energy management logic 200 may receive occupancy data via other sensors.

At 205, AP energy management logic 200 executes a process to predict occupancy for each radio type (2.4, 5, 6 GHz) and picks a minimum or selected number of APs to be in coverage mode to provide coverage for the predicted lower occupancy for predetermined periods of time. The process to predict occupancy may leverage machine learning and/or artificial intelligence to process the occupancy information and channel utilization information.

At 206, AP energy management logic 200 sends, to WLC 105, a list of AP radios that should be turned off, and a list of low power APs that should be converted to standard (or higher) power mode for coverage, all consistent with the predicted occupancy for the predetermined period of time(s).

Optionally, where the deployed APs contain embedded antennas that may be software steerable, such antennas can be controlled to change the AP's beam pattern. For example, when in a low-power mode for capacity, the antenna pattern may be narrow, while when in a standard (or higher) power mode for the selected AP, the antenna pattern may provide a wide beam for coverage. Indeed, AP energy management logic 200 may be configured to manage channel selection, channel widths, and power settings for APs in WLAN 100.

At 207, during a low-occupancy period, WLAN 100 is operated in coverage mode to conserve energy based on predicted occupancy. Energy saving may be reported to AP energy management logic 200 and/or to a network administrator. AP energy management logic 200 may continually or periodically monitor WLAN 100 for any capacity changes or anomalies (i.e., a deviation from the prediction).

At the start of a peak hour or change in prediction and capacity for WLAN 100, e.g., prior to exiting a low-occupancy period, WLC 105 may be instructed by AP energy management logic 200 to switch on previously switched-off AP radios, convert selected APs from coverage mode to capacity mode on all or some radios, and/or update an antenna pattern (e.g., directional to omni) for one or more APs.

As an additional embodiment, AP energy management logic 200 may be configured to take into account actual end-user throughput via observed traffic flows, as well as to receive and respond to subjective user input (e.g., via a portal or quality of experience (QoE) application) and use input/feedback to further refine/influence the selection of which APs/radios are turned on or off during a predicted low-occupancy period. That is, the system may operate in a predictive manner, and may also self-adjust based on received/observed feedback. Adjustment may also be made in view of a coverage hole that might occur/be detected if too many APs are turned off during coverage mode (i.e., during the predicted low-occupancy period).

Figure 3A:
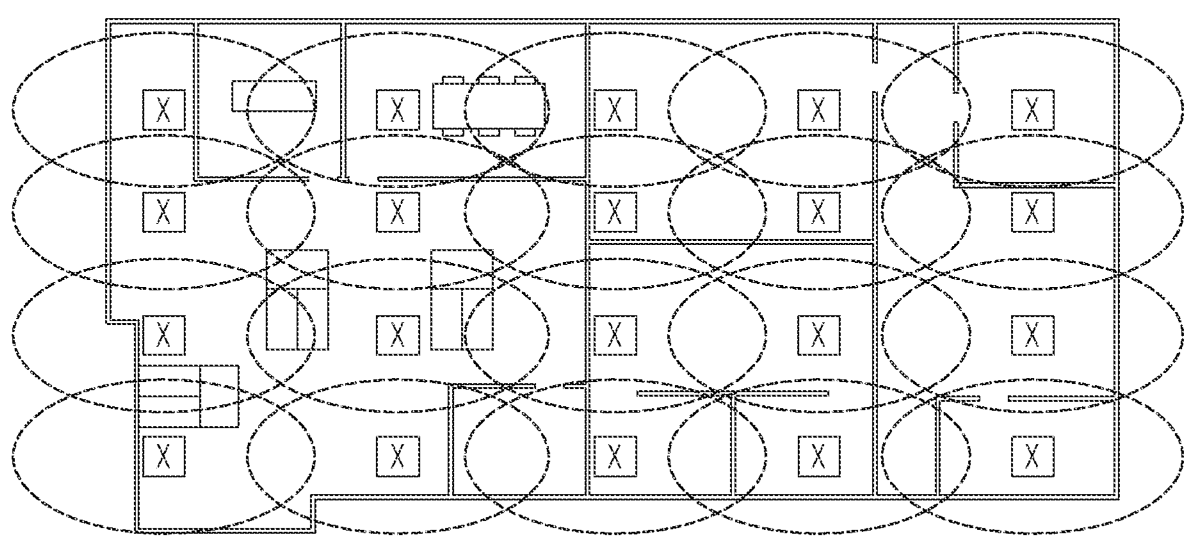
FIG. 3A shows a plurality of APs in capacity mode.
Figure 3B:
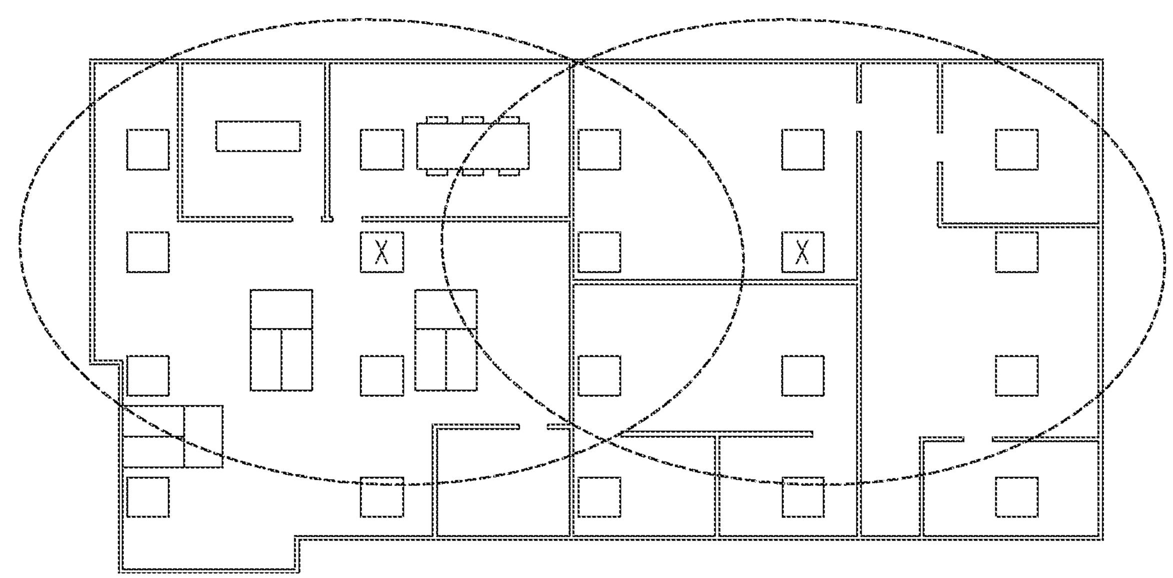
FIG. 3B shows a subset of those APs that are employed in coverage mode, according to an example embodiment.

FIG. 3A shows a plurality of APs in capacity mode, and FIG. 3B shows a subset of those APs that are employed in coverage mode, according to an example embodiment. More specifically, initially, as shown in FIG. 3A, all APs (designated as "X"s) in a given location (e.g., an office location) are turned on. This is what is referred to as capacity mode. After AP energy management logic 200 identifies usage patterns through, e.g., machine learning or AI processing using the data received as explained with reference to FIG. 2. APs can be placed in coverage mode, wherein most of the APs are powered off, leaving, in the example case of FIG. 3B, only two APs powered on, and, possibly, with different antenna patterns or powers.

Thus, as those skilled in the art will appreciate, AP energy management logic 200 may be configured to make channel selection, set channel widths, and set power settings for APs to provide an energy saving coverage mode (as opposed to a capacity mode) for WLAN 100. Also, AP energy management logic 200 may operate to account for 2.4 GHz, 5 GHz, 6 GHz, and Wi-FI6E spectrum, including power settings for each of those bands, as appropriate.

Figure 4:
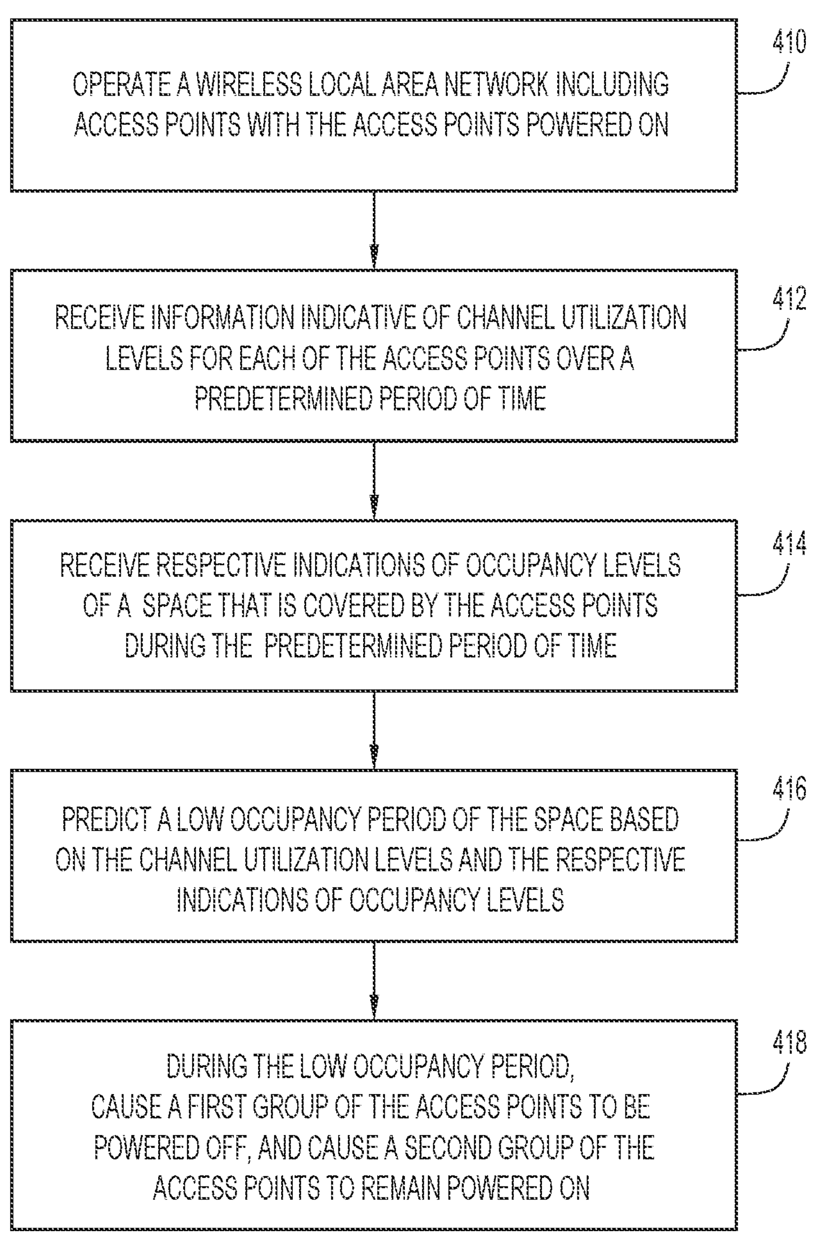
FIG. 4 is a flowchart illustrating a series of operations that may be executed by AP energy management logic, according to an example embodiment.

FIG. 4 is a flowchart illustrating a series of operations executed by AP energy management logic 200, according to an example embodiment. At 410, an operation includes operating a wireless local area network including access points with the access points powered on. At 412, an operation includes receiving information indicative of channel utilization levels for each of the access points over a predetermined period of time. At 414, an operation includes receiving respective indications of occupancy levels of a space that is covered by the access points during the predetermined period of time. At 416, an operation includes predicting a low-occupancy period of the space based on the channel utilization levels and the respective indications of occupancy levels. And, at 418, an operation includes during the low-occupancy period, causing a first group of the access points to be powered off, and causing a second group of the access points to remain powered on.

Figure 5:
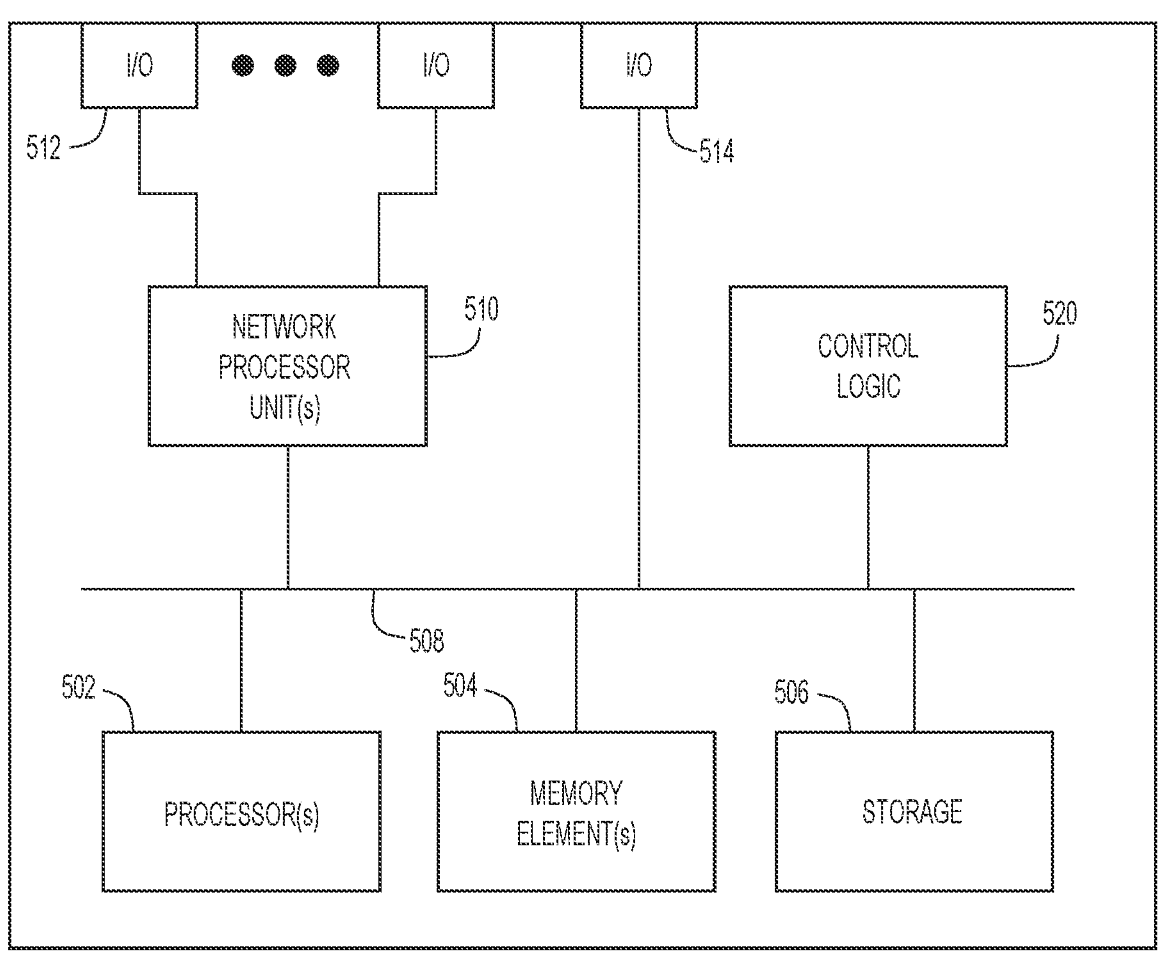
FIG. 5 is a block diagram of a computing device that may be configured to execute AP energy management logic and perform the techniques described herein, according to an example embodiment.

FIG. 5 is a block diagram of a computing device that may be configured to execute AP energy management logic 200 and perform the techniques described herein, according to an example embodiment. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520 (which could include, for example, AP energy management logic 200). In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer-readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but are not limited to, providing overall control operations of a computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read-only memory (ROM), erasable programmable read-only memory (EPROM), application-specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer-readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with the teachings of the present disclosure.

In some instances, software of the present embodiments may be available via a non-transitory computer-readable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer-readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer-readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software-defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communication may be used, such as electric, sound, light, infrared, and/or radio, to facilitate communication through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method may include operating a wireless local area network including access points with the access points powered on, receiving information indicative of channel utilization levels for each of the access points over a predetermined period of time, receiving respective indications of occupancy levels of a space that is covered by the access points during the predetermined period of time, predicting a low occupancy period of the space based on the channel utilization levels and the respective indications of occupancy levels, and during the low occupancy period, causing a first group of the access points to be powered off, and causing a second group of the access points to remain powered on.

The method may further include changing a power mode of the second group of the access points during the low occupancy period.

The method may further include changing the power mode to a standard or high power mode during the low occupancy period.

In the method, the power mode of the second group of the access points is sufficient to cover the space for the wireless local area network during the low occupancy period.

The method may further include modifying an antenna beam pattern of at least one access point in the second group of the access points.

The method may further include powering off selected radios of access points in the second group of the access points.

The method may further include, prior to exiting the low occupancy period, powering on the first group of the access points.

The method may further include receiving information of a coverage hole in the space and, in response, powering on at least one access point from the first group of the access points.

In the method, the information indicative of channel utilization levels may include device count and device type in communication with the access points.

In the method, predicting the low occupancy period may include processing the information indicative of channel utilization levels and the respective indications of occupancy levels using at least one of machine learning or artificial intelligence.

In another embodiment, a device may be provided and may include an interface configured to enable network communications, a memory, and one or more processors coupled to the interface and the memory, and configured to: operate a wireless local area network including access points with the access points powered on, receive information indicative of channel utilization levels for each of the access points over a predetermined period of time, receive respective indications of occupancy levels of a space that is covered by the access points during the predetermined period of time, predict a low occupancy period of the space based on the channel utilization levels and the respective indications of occupancy levels, and during the low occupancy period, cause a first group of the access points to be powered off, and cause a second group of the access points to remain powered on.

In the device, the one or more processors may be further configured to change a power mode of the second group of the access points during the low occupancy period.

In the device, the one or more processors may be further configured to change the power mode to a standard or high power mode during the low occupancy period.

In the device, the power mode of the second group of the access points is sufficient to cover the space for the wireless local area network during the low occupancy period.

In the device, the one or more processors may be further configured to modify an antenna beam pattern of at least one access point in the second group of the access points.

In the device, the one or more processors may be further configured to power off selected radios of access points in the second group of the access points.

In the device, the information indicative of channel utilization levels may include device count and device type in communication with the access points.

In yet another embodiment, one or more non-transitory computer-readable storage media encoded with instructions are provided and that, when executed by a processor, cause the processor to: operate a wireless local area network including access points with the access points powered on, receive information indicative of channel utilization levels for each of the access points over a predetermined period of time, receive respective indications of occupancy levels of a space that is covered by the access points during the predetermined period of time, predict a low occupancy period of the space based on the channel utilization levels and the respective indications of occupancy levels, and during the low occupancy period, cause a first group of the access points to be powered off, and cause a second group of the access points to remain powered on.

The one or more non-transitory computer-readable storage media may further include instructions that are configured to change a power mode of the second group of the access points during the low occupancy period.

The one or more non-transitory computer-readable storage media may further include instructions that are configured to modify an antenna beam pattern of at least one access point in the second group of the access points.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

operating a wireless local area network including access points with the access points powered on;

receiving information indicative of channel utilization levels for each of the access points over a predetermined period of time, wherein the information indicative of the channel utilization levels includes brand and model information for user equipment communicating with the access points via channels included in the information indicative of the channel utilization levels;

receiving respective indications of occupancy levels of a space that is covered by the access points during the predetermined period of time;

predicting a low occupancy period of the space based on the channel utilization levels and the respective indications of occupancy levels; and during the low occupancy period, causing a first group of the access points to be powered off, and causing a second group of the access points to remain powered on.

2. The method of claim 1, further comprising changing a power mode of the second group of the access points during the low occupancy period.

3. The method of claim 2, further comprising changing the power mode to a standard or high power mode during the low occupancy period.

4. The method of claim 2, wherein the power mode of the second group of the access points is sufficient to cover the space for the wireless local area network during the low occupancy period.

5. The method of claim 1, further comprising modifying an antenna beam pattern of at least one access point in the second group of the access points.

6. The method of claim 1, further comprising powering off selected radios of access points in the second group of the access points.

7. The method of claim 1, further comprising prior to exiting the low occupancy period, powering on the first group of the access points.

8. The method of claim 1, further comprising receiving information of a coverage hole in the space and, in response, powering on at least one access point from the first group of the access points.

9. The method of claim 1, wherein predicting the low occupancy period comprises processing the information indicative of channel utilization levels and the respective indications of occupancy levels using at least one of machine learning or artificial intelligence.

10. A device comprising:

an interface configured to enable network communications;

a memory; and one or more processors coupled to the interface and the memory, and configured to:

operate a wireless local area network including access points with the access points powered on;

receive information indicative of channel utilization levels for each of the access points over a predetermined period of time, wherein the information indicative of the channel utilization levels includes brand and model information for user equipment communicating with the access points via channels included in the information indicative of the channel utilization levels;

receive respective indications of occupancy levels of a space that is covered by the access points during the predetermined period of time;

predict a low occupancy period of the space based on the channel utilization levels and the respective indications of occupancy levels; and during the low occupancy period, cause a first group of the access points to be powered off, and cause a second group of the access points to remain powered on.

11. The device of claim 10, wherein the one or more processors are further configured to change a power mode of the second group of the access points during the low occupancy period.

12. The device of claim 11, wherein the one or more processors are further configured to change the power mode to a standard or high power mode during the low occupancy period.

13. The device of claim 11, wherein the power mode of the second group of the access points is sufficient to cover the space for the wireless local area network during the low occupancy period.

14. The device of claim 10, wherein the one or more processors are further configured to modify an antenna beam pattern of at least one access point in the second group of the access points.

15. The device of claim 10, wherein the one or more processors are further configured to power off selected radios of access points in the second group of the access points.

16. One or more non-transitory computer readable storage media encoded with instructions that, when executed by a processor, cause the processor to:

operate a wireless local area network including access points with the access points powered on;

receive information indicative of channel utilization levels for each of the access points over a predetermined period of time, wherein the information indicative of the channel utilization levels includes brand and model information for user equipment communicating with the access points via channels included in the information indicative of the channel utilization levels;

receive respective indications of occupancy levels of a space that is covered by the access points during the predetermined period of time;

predict a low occupancy period of the space based on the channel utilization levels and the respective indications of occupancy levels; and during the low occupancy period, cause a first group of the access points to be powered off, and cause a second group of the access points to remain powered on.

17. The one or more non-transitory computer readable storage media of claim 16, wherein the instructions are configured to change a power mode of the second group of the access points during the low occupancy period.

18. The one or more non-transitory computer readable storage media of claim 16, wherein the instructions are configured to modify an antenna beam pattern of at least one access point in the second group of the access points.

19. The one or more non-transitory computer readable storage media of claim 16, wherein the instructions are configured to power off selected radios of access points in the second group of the access points.

20. The one or more non-transitory computer readable storage media of claim 16, wherein the instructions are configured to, prior to exiting the low occupancy period, power on the first group of the access points.

* * * * *